(No Model.) 2 Sheets—Sheet 2.
C. G. PERKINS.
UNDERGROUND CONDUIT FOR ELECTRICAL CONDUCTORS.
No. 349,739. Patented Sept. 28, 1886.
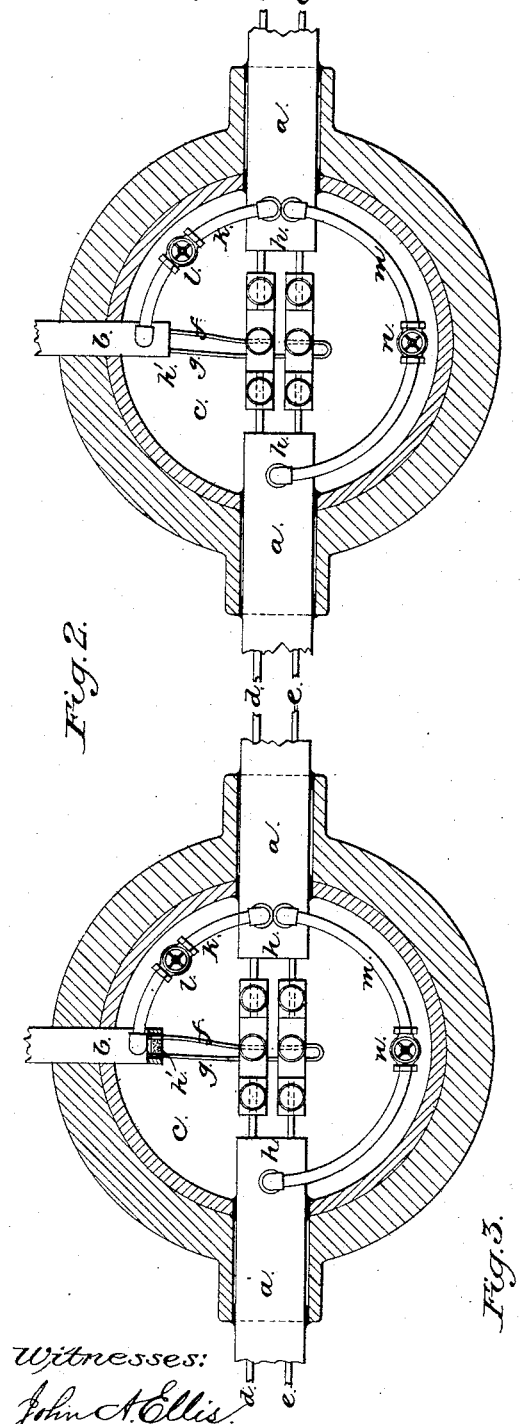
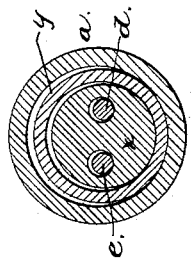
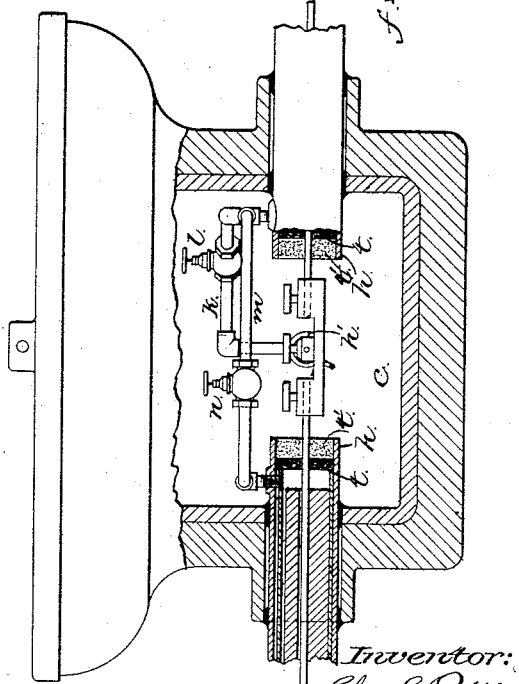
Witnesses:
John A. Ellis
John F. Meyer
Inventor:
Chas. G. Perkins
per J. S. Hurdle
Atty.

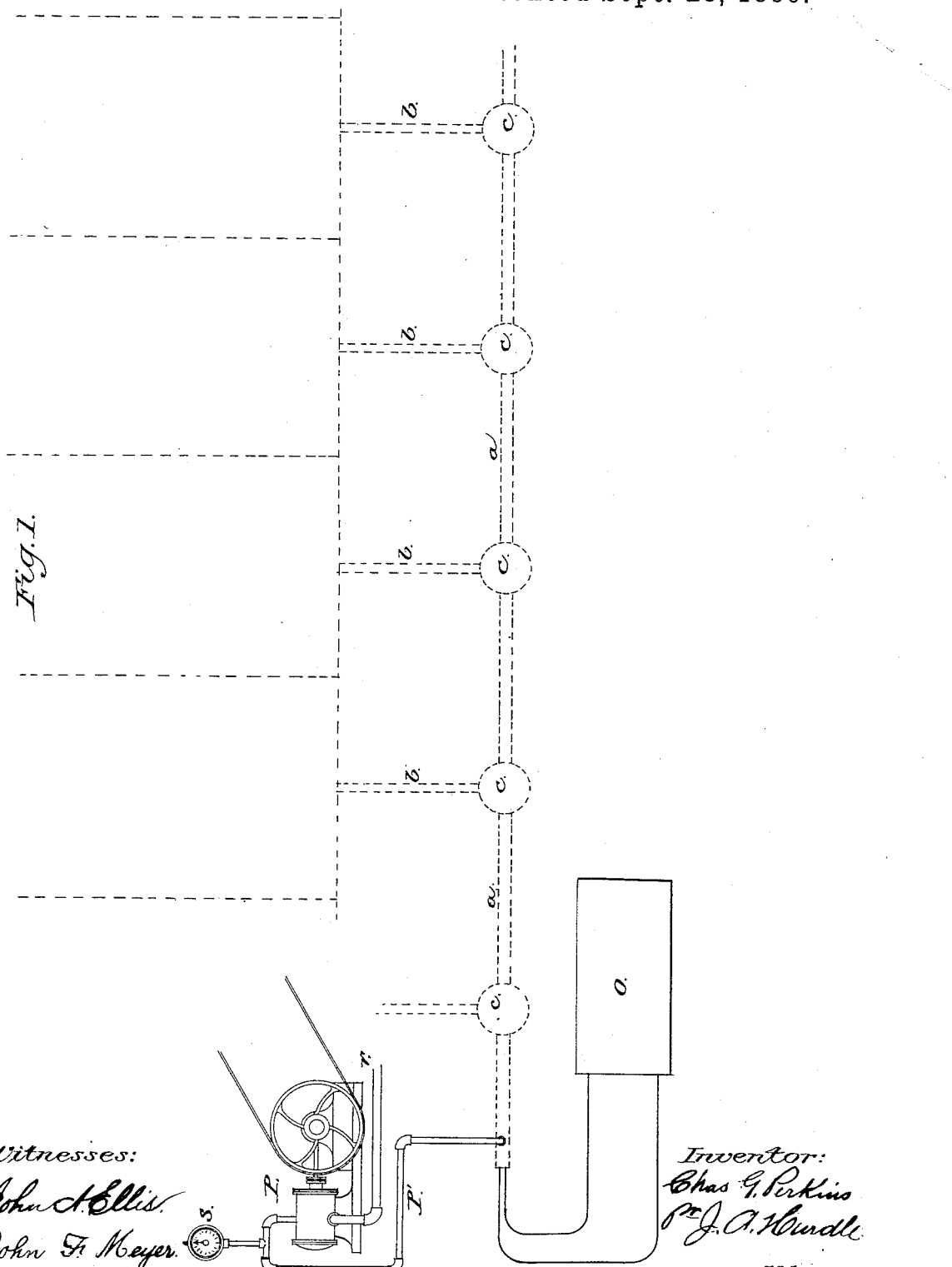

UNITED STATES PATENT OFFICE.

CHARLES G. PERKINS, OF NEW YORK, N. Y., ASSIGNOR TO THE IMPERIAL ELECTRIC LIGHT COMPANY, OF SAME PLACE.

UNDERGROUND CONDUIT FOR ELECTRICAL CONDUCTORS.

SPECIFICATION forming part of Letters Patent No. 349,739, dated September 28, 1886.

Application filed December 14, 1883. Serial No. 114,505. (No model.)

*To all whom it may concern:*

Be it known that I, CHARLES G. PERKINS, a citizen of the United States, and a resident of New York, in the county of New York and State of New York, have invented certain new and useful Improvements in Underground Conduits for Electrical Conductors, of which the following is a specification.

My invention relates to underground conduits for electrical conductors, and especially to means for testing the same and freeing the same from moisture.

I have illustrated my invention in the accompanying drawings, in which Figure 1 represents diagrammatically my system as a whole. Fig. 2 is a horizontal section of two of my test-boxes. Fig. 3 is an elevation, partly sectional, of one of my test-boxes. Fig. 4 is a section of my conduit with its inclosed conductors, and Fig. 5 illustrates my method of sealing my conduit, and also the manner in which my conductors are led into a building.

The particular form of conduit to be used in connection with my invention is a matter of comparative indifference. I have shown my conductors $d$ and $e$ as lying in longitudinal perforations in a clay cylinder, $x$, which is surrounded by a pipe, $y$, of some diamagnetic metal. The whole is surrounded by a pipe, $a$, of glazed clay. This construction of conduit is described and claimed in another application filed by me and still pending in the United States Patent Office. It will be observed that the inclosed parts do not fit tightly in their casings, but leave room for the air to circulate under the proper conditions. This conduit is led into test-boxes in the usual manner, and the conductors are there coupled as may be desired.

In Fig. 2, $b$ represents a branch conduit extending into the test-box $c$, while $a$ $a$ are parts of the main conduit. Before passing into the test-box to be coupled the conductors are made to pass through a plug, $t$, of asbestus and a packing, $t'$, of cement or other suitable sealing material, the whole forming a hermetical seal to the inner ends of the conduits. A similar construction exists at the terminus of each branch conduit, as shown in Fig. 5, $h$ in that figure representing the end of a conduit, and $h'$ a cap covering the same. The parts of the main conduit are connected through each test-box by a pipe, $m$, in which is located a stop-cock, $n$. One part of the main conduit is also connected with the branch $b$ by a pipe, $k$, in which is located a stop-cock, $l$. The conduit $a$ is connected with an exhaust pump, P, (see Fig. 1,) by a pipe, P'.

S is a vacuum-gage connected with the suction-pipe P', and $r$ is the discharge-pipe.

The parts being arranged as shown in the drawings, it is possible at any time either to withdraw from the whole system, by means of the pump, any moisture that may have collected in the pipes, or to locate the part that is out of order in case the pump fails to accomplish that result. The former is accomplished simply by opening all the stop-cocks, $l$ $n$, and causing the pump to operate. If the vacuum-gage fail to register a sufficient degree of exhaustion, thereby indicating imperfect sealing at some point, the stop-cocks may be closed one after another until only one branch conduit is pneumatically connected with the suction-pipe P. It is evident that any desired branch can be so connected that by successive trials with the pump and vacuum-gage it will be possible to determine whether and where there is an imperfect sealing, and so to take measures for remedying the defect.

It is recognized by those familiar with the art that moisture is the most dangerous enemy to the effectiveness of the underground conduit. The gist of my present invention lies in providing suitable and convenient means for removing moisture from conduits.

In the drawings, Fig. 1, $o$ represents a dynamo or other suitable generator of electricity.

Having now described my invention, what I claim, and desire to secure by Letters Patent, is—

In an underground conduit for electrical conductors having one or more test-boxes in the circuit thereof, the conduit terminating within the test-boxes hermetically sealed, the interior parts of the conduits connected with each other by means forming an air or water conduit having a device connected therewith adapted to open and close the communication between them, and a subordinate branch of the conduit, which also terminates within a test-box and has its extreme ends hermetically
5 sealed, the interior of the subordinate branch connected with that of the main conduit by means forming an air or water conduit, and having a device connected therewith adapted to open and close the same, substantially as
10 shown and described.

Signed at New York, in the county of New York and State of New York, this 13th day of December, A. D. 1883.

CHARLES G. PERKINS.

Witnesses:
E. WM. EDWARDS,
J. A. HURDLE.